United States Patent [11] 3,592,534

| [72] | Inventors | Sherman W. Duck;<br>Robert K. Willardson, both of Arcadia, Calif. |
|---|---|---|
| [21] | Appl. No. | 814,098 |
| [22] | Filed | Apr. 7, 1969 |
| [45] | Patented | July 13, 1971 |
| [73] | Assignee | Bell & Howell Company<br>Chicago, Ill. |

[54] AUDIOVISUAL DISPLAY SYSTEM
25 Claims, 4 Drawing Figs.

[52] U.S. Cl. ............................................. 352/28, 353/19
[51] Int. Cl. ............................................. G03b 31/02, G03b 31/04
[50] Field of Search ............................................. 352/25, 28; 353/19; 250/219

[56] References Cited
UNITED STATES PATENTS
1,946,206  2/1934  Goldsmith .................... 352/28
2,015,344  9/1935  Kosken ........................ 352/28

FOREIGN PATENTS
300,235  1/1930  Great Britain ................ 352/28
719,234  3/1942  Germany ...................... 352/28

Primary Examiner—Louis R. Prince
Assistant Examiner—Joseph W. Roskos
Attorney—Raymond A. Andrew ABSTRACT: An audiovisual display system in which a projection lens projects recorded images from an image plane as well as optical radiations modulated by sound accompaniments for the images. The sound accompaniments are picked up at a location displaced from the image plane or are picked up by external playback equipment and are presented at a location within optical reach of the projection lens for simultaneous projection by the same projection lens. The optical radiations are preferably invisible and time modulated by the sound accompaniments.

PATENTED JUL 13 1971 3,592,534

INVENTORS,
SHERMAN W. DUCK
ROBERT K. WILLARDSON

AUDIOVISUAL DISPLAY SYSTEM

BACKGROUND OF THE INVENTION

1. Field of the Invention

The present invention relates to improved audiovisual display systems.

2. Description of the Prior Art

For increased realism it is important that sound accompaniments for motion picture scenes are made to appear to emanate from the same location as the scenes. Accordingly, a placement of the sound-reproducing loudspeaker at the motion picture screen is preferred over a location of the loudspeaker at the motion picture projector.

Since the sound of sound-accompanied motion pictures is customarily picked up at the projector, the above mentioned preferred loudspeaker placement has, however, the disadvantage of requiring the running of a cord or cable from the projector to the screen for a transmission of the picked up sound to the loudspeaker. This is particularly objectionable in connection with temporary installations for displaying movies in a home, school or similar institution.

A prior art proposal attempted to overcome this disadvantage by providing a special optical system which projects the sound track of motion picture film onto a marginal region of the screen adjacent the area onto which the projector lens casts the motion picture images. A photocell is then disposed behind a slit in such marginal region for receiving the projected soundtrack. The electric sound signal provided by the photocell is amplified and rendered audible by equipment which may be connected to a wall socket that is remote from the wall socket to which the projector is connected so that no cable or cord extends between the projector and the screen where people could be tripped.

This prior art proposal has the disadvantage that the sound track projection system has to be refocused whenever the screen is moved. Also, if the screen is to be displaceable rather than fixed, a parallax error between the image projection lens and the sound track projection lens has to be taken into account and corrected as the screen location is changed.

Other prior art proposals tried to solve the problem by recording the images and sound accompaniments on the film in physical synchronism side by side so that the same lens could handle images as well as sound accompaniments. The requirement of physical synchronism of image and sound has rendered these proposals virtually useless, since practical reasons have so far required that sound accompaniments be recorded at a displacement from the corresponding images.

SUMMARY OF THE INVENTION

The subject invention overcomes the above mentioned disadvantages.

From one aspect thereof the invention resides in a system for displaying recorded images from a motion picture film and reproducing for the displayed images, which sound accompaniments are recorded on the motion picture film at a displacement from the corresponding images. This system is characterized by the improvement comprising in combination first means for selectively presenting the recorded images in an image plane, second means spaced from the image plane for picking up the recorded sound accompaniments at a location spaced from the image plane in accordance with the above mentioned displacement, and third means connected to the second means for presenting at the image plane optical radiations modulated by sound accompaniments picked up by the second means. This combination further includes fourth means spaced from the image plane and defining a projection plane, fifth means located at the projection plane for receiving the modulated optical radiations and for audibly reproducing the sound accompaniments from such received modulated optical radiations, and a projection lens means common to the recorded images and to the modulated optical radiations for both projecting the recorded images from the image plane onto the projection plane and projecting the modulated optical radiations from the above-mentioned third means to the fifth means.

"Optical radiations" is herein employed as a broad expression designating light, including invisible spectra adjacent visible light, susceptible to focusing by projection lens means. The expression "at the image plane" used with respect to the optical radiations refers not only to a structure where the radiations are presented exactly on the image plane itself, but also to structures where the radiations are present somewhat ahead of the image plane or, by means of a mirror or prism for example, somewhat behind the image plane as seen from the projection lens means, so as to provide for the proper focusing by the projection lens means of the particular optical radiations.

The use of one projection lens means, which may include a single projection lens or a projection lens system, for both the projection of the recorded images and the projection of the sound-modulated optical radiations has the advantage that the sound-modulated optical radiations are automatically focused on the above mentioned fourth means whenever the images are refocused onto the projection plane upon a relocation thereof. In addition, the use of the one projection lens means for both projections dispenses with the necessity of parallax error correction upon relocation of the screen.

From a further aspect thereof, the subject invention resides in a system for displaying images recorded on a first medium, and reproducing sound accompaniments recorded on a second medium separate from said first medium. This system is characterized by the improvement comprising, in combination, first means for selectively representing the recorded images in an image plane, second means for picking up the recorded sound accompaniments from the separate second medium, third means connected to the second means for representing at the image plane optical radiations modulated by sound accompaniments picked up by the second means, fourth means spaced from the image plane and defining a projection plane, fifth means located at the projection plane for receiving the modulated optical radiations and for audibly reproducing the sound accompaniments from the received modulated optical radiations, and a projection lens means common to the recorded images and the modulated optical radiations for both projecting the recorded images from the image plane onto the projection plane and projecting the modulated optical radiations from the third means to the fifth means. The improvements so far described are easily adapted to handle sound accompaniments played back from a soundtrack on the motion picture film as well as sound accompaniments played back by a magnetic tape recorder synchronized with the motion picture projector. The latter versatility is receiving increased importance with the advent of amateur motion picture systems in which sound is recorded on magnetic tape separate from the film.

From another aspect thereof the invention resides in a motion picture projector apparatus for motion picture film on which sound accompaniments are recorded at a displacement from corresponding motion picture images. This projector apparatus is characterized by the improvement comprising in combination a picture gate, first means for serially presenting motion picture images at the picture gate, second means spaced from the picture gate for picking up the recorded sound accompaniments for the motion picture images at a location spaced from the picture gate in accordance with the displacement between image and corresponding sound recording, third means connected to the second means for presenting at the picture gate optical radiations modulated by sound accompaniments, picked up by the second means and a projection lens means common to the image presented at the picture gate and the modulated optical radiations for both projecting the images from the picture gate and projecting the modulated optical radiations.

The advantages of this projector apparatus over prior art equipment are the same as those detailed above with respect to the aforesaid systems according to the subject invention.

BRIEF DESCRIPTION OF THE DRAWINGS

The invention and further aspects thereof will become more readily apparent from the following detailed description of preferred embodiments illustrated by way of example in the accompanying drawings in which.

DESCRIPTION OF PREFERRED EMBODIMENTS

Figure 1:
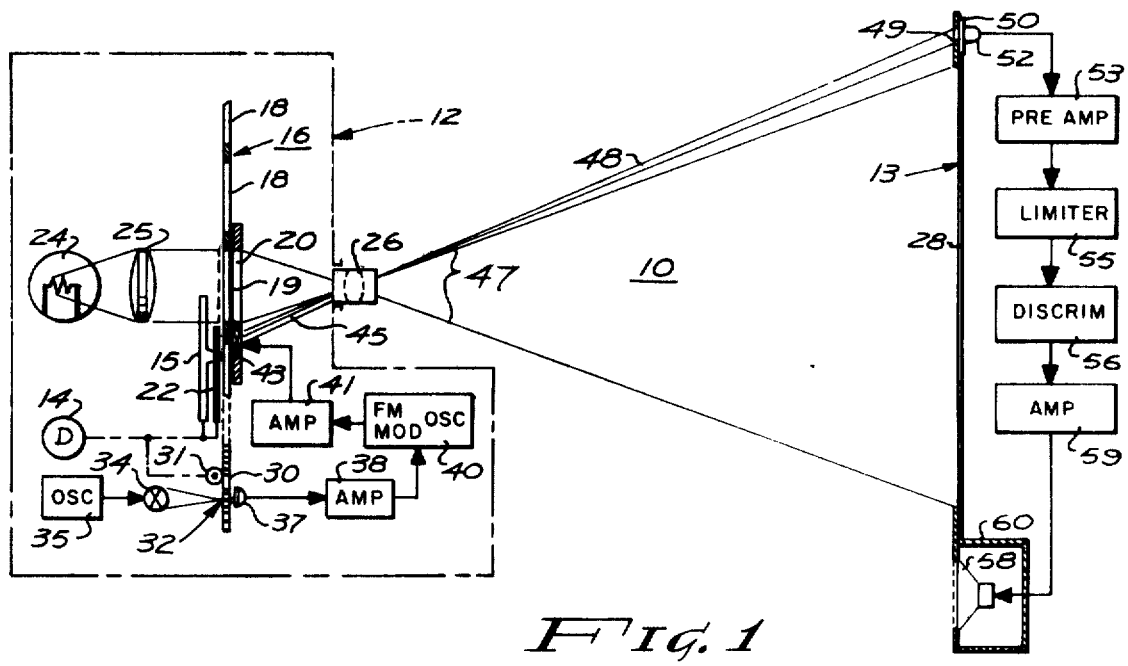
FIG. 1 is a side view, partially in section, of the more important parts of an audiovisual display system in accordance with a preferred embodiment of the subject invention.

The audiovisual display system 10 illustrated in FIG. 1 comprises a motion picture projector apparatus 12 and a screen structure 13.

The projector 12 includes a drive 14 for advancing, with the aid of a pulldown 15, a motion picture film 16 from a supply reel (not shown) to a takeup reel (not shown). In accordance with conventional practice the motion picture images 18 are serially presented in an image plane 19 at a picture age 20. While FIG. 1 indicates an intermittent image advance in which a shutter 22 obscures the picture gate 20 during each pulldown of the film 16, it should be understood that the projector may, alternatively, be of a continuous film motion type.

A projector lamp 24 illuminates the image plane 19 with the aid of a condenser lens 25. The images thus illuminated are projected by a projector lens 26 onto the projection plane 28 of the screen structure 13.

As also shown in FIG. 1, the film 16 includes an optical sound tract 30. In accordance with conventional practice and as indicated at 31, the soundtrack 30 is continuously advanced through a sound pickup station 32.

Pickup station 32 includes a lamp 34 which is energized by an oscillator 35. The latter provides a lamp energizing current at a supersonic frequency which does not become audible in the reproduced sound. The light emitted by the lamp 34 is processed by conventional lenses (not shown) and is modulated by the sound track 30. Such modulated light is picked up by a photocell 37 which supplies a correspondingly modulated electric input signal to an amplifier 38.

It will be noted in this connection that the sound track 30 is illustrated as a so-called varying density track. It should however be understood that a varying area track may be used instead. By the same token, a magnetic sound track could be used on the film 16, in which case a magnetic playback head would replace the photocell 37.

Upon amplification at 38, the sound-modulated signal is applied to a frequency modulated oscillator 40. While frequency modulation has been indicated in the drawings, it should be understood that another form of time modulation, such as the more common phase modulation may be used instead.

The sound-modulated oscillations provided at 40 are supplied to an amplifier 41 for amplification prior to application to a device 43 for converting the sound-modulated electrical oscillations into corresponding sound-modulated optical radiations 45.

If desired, the modulated oscillator 40 may be dispensed with and the signal provided by the pickup 37 may be applied directly to the device 43 upon a suitable amplification thereof. A time modulation of the sound signal is, however, preferred since most interferences occurring in a projection system, such as puff of tobacco smoke and the like, vary the intensity of radiations 45. Detrimental effects of such intensity variations are generally avoided by the use of time modulation.

Similarly, the device 43 may be of a type which emits visible modulated light. The use of invisible radiations for transmitting the sound information is however preferred, since the luminosity and flicker of a visible sound transmission beam interfere with the viewing of the motion picture.

In accordance with a preferred embodiment of the subject invention, the device 43 includes a gallium-arsenide high-efficiency infrared emitting diode designed for continuous application. Such diodes are now commercially available. A good example is the RCA Gallium-Arsenide Infrared Emitting Diode Type 40598A, the emission spectrum of which is in the 9,000 angstrom region. Briefly, such gallium-arsenide diode has a PN junction which radiates when forward biased. The radiation produced in this manner varies with variations in the applied bias.

In accordance with the subject invention, the projector lens 26 projects not only the images 19 in a beam 47 but also the sound-modulated radiations 45 in a beam 48. The latter penetrates an aperture 49 in the screen structure 13. An optical filter 50 located behind the aperture 49 is designed to pass the infrared radiations 45 in the beam 48, but to block visible radiations from the beam 47 or from other sources.

The sound-modulated radiations passed by the filter 50 are picked up by a device 52 for converting such sound-modulated radiations into a correspondingly modulated electric signal which is applied to a preamplifier 53. In accordance with a further preferred embodiment of the subject invention, the device 52 comprises a photocell that has a response characteristic which peaks at or near the emission peak of the device 43. If such device 43 is a gallium-arsenide diode of the above mentioned type, then the device 52 is preferably a silicon photocell. Silicon photovoltaic cells with the desired characteristics are commercially available. A suitable example is the Hoffman Silicon Photovoltaic Cell HSR-10.

Upon preamplification at 53, the modulated sound signal is applied to a limiter 55 and discriminator 56, which may be separate units or may be combined in accordance with conventional design. The limiter 55 cuts off amplitude excursions in the received time-modulated signal to reduce the sensitivity of the system to amplitude variations during transmission. The discriminator 56 recovers the sound signal from the preamplified and limited modulated oscillations.

This recovered or "demodulated" sound signal corresponds to the original sound signal provided by the pickup 37. Accordingly, a loudspeaker 58 will reproduce the sound represented by the track 30 if the recovered signal is applied thereto upon amplification by an amplifier 59. Since suitable preamplifier, modulated oscillator, limiter, discriminator and power amplifier circuits are known in the electronics art, no detailed illustration thereof is provided in the subject drawings.

The loudspeaker 58 is installed in a loudspeaker housing 60 which is incorporated in the screen structure 13 so that the sound accompaniments emanate from the same region as the projected images for an increased realism of the motion picture performance. The electronic equipment shown at the screen structure 13 may be energized with a battery located at the screen structure 13, or from a wall socket which is remote from the socket which energizes the projector 12, so that no cable extends between the projector 12 and the screen 13, where persons could be tripped thereby.

If the screen structure 13 is relocated relative to the projector 12, the motion picture images are refocused onto the projection area 28 by adjusting the projection lens 26 in accordance with standard practice. This automatically refocuses the beam 48 onto the receiving device 52 and no parallax errors have to taken into consideration, and no separate adjustments have to be made.

If desired, the illustrated systems can easily be designed for the projection and handling of two sound-modulated beams for the reproduction of stereophonic sound. Pursuant to the principles of the subject invention, both of these beams would be projected by one and the same lens or lens system which also handles the motion picture images. Alternatively, suitable signal-multiplexing techniques may be used to combine multiple signal sources onto one modulated light beam. At the screen, then, the received light beam would be demodulated and the resulting signal demultiplexed to separate the original signals.

Figure 2:
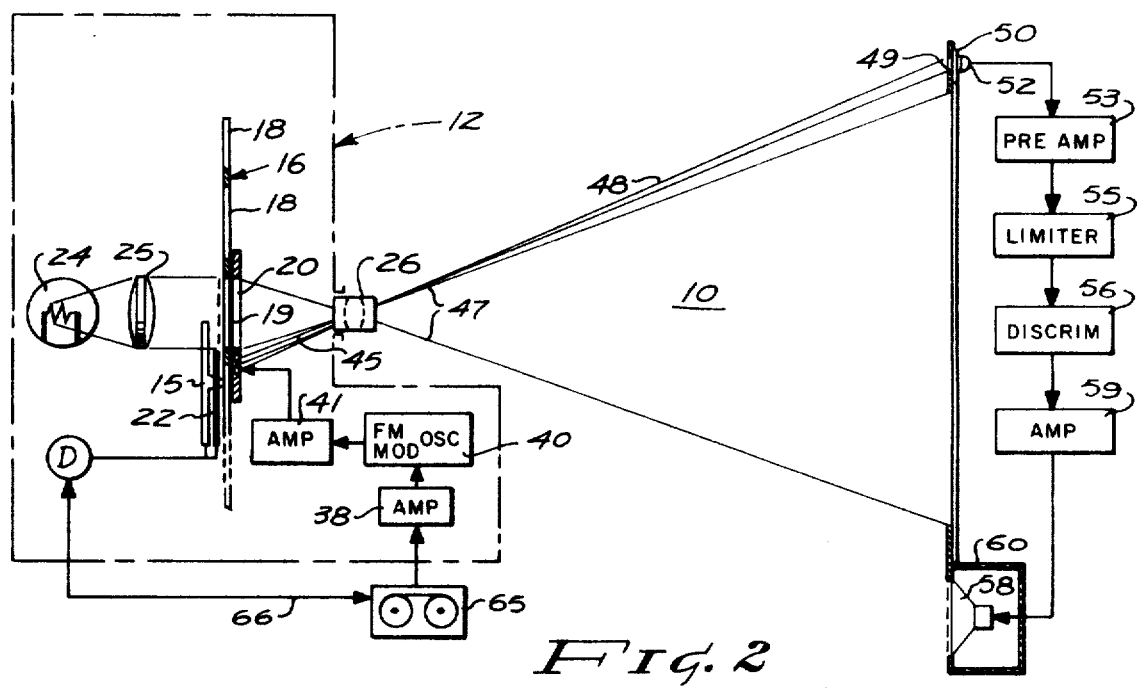
FIG. 2 illustrates a modification of the system shown in FIG. 1.

A further advantage of the system illustrated in FIG. 1 is shown in FIG. 2 where like reference numerals as among FIGS. 1 and 2 designate like parts.

In accordance with FIG. 2 the amplifier 38 does not receive a sound signal picked up from a soundtrack on the film 16, but rather a sound signal reproduced by a magnetic tape recorder 65, which is preferably synchronized with the operation of projector 12 as indicated by a link 66. Motion picture projection systems in which sound accompaniments are recorded on a medium separate from the film have not only antedated so-called sound film, but are presently receiving renewed promotion and acceptance in view of the fact that sound tracks are not easily provided on small-format amateur film.

In viewing FIGS. 1 and 2 it will be seen that the basic system disclosed therein handles film-derived and tape-derived sound reproductions equally well. This is not at all the case with prior art equipment in which the film sound track itself is projected toward the screen.

Moreover, since the operation of the system according to the subject invention is not dependent on the presence of a sound track on the film 16, the inventive principle may easily be applied to the sound-accompanied display of still pictures. In this case, the projector 12 would be a still projector and the tape recorder 65 would provide suitable sound accompaniments for the displayed still pictures.

Figure 3:
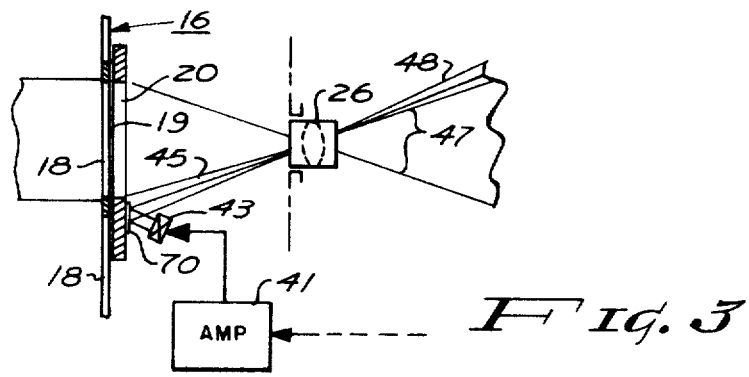
FIG. 3 illustrates a further modification of the system shown in FIG. 1.

As already indicated above, the means which present the sound-modulated optical radiations 45 at the image plane 19 need not necessarily be located on this image plane. In fact, such a simultaneous location of the means (e.g. the diode 43) and the film 16 may be physically impossible. According to the modification shown in FIG. 3, in which like reference numerals as among FIGS. 1, 2 and 3 designate like parts, a means 70 is used for reflecting the radiations 45 provided by the device 43 into the projector lens 26. The means 70, which may be a mirror as shown, or then a prism or a light-conducting pipe or the like, thus enables a location of the device 43 spaced from the image plane 19, and at the same time still provides for a presentation of the sound-modulated radiations 45 at the image plane 19 as seen by the projector lens means 26.

Figure 4:
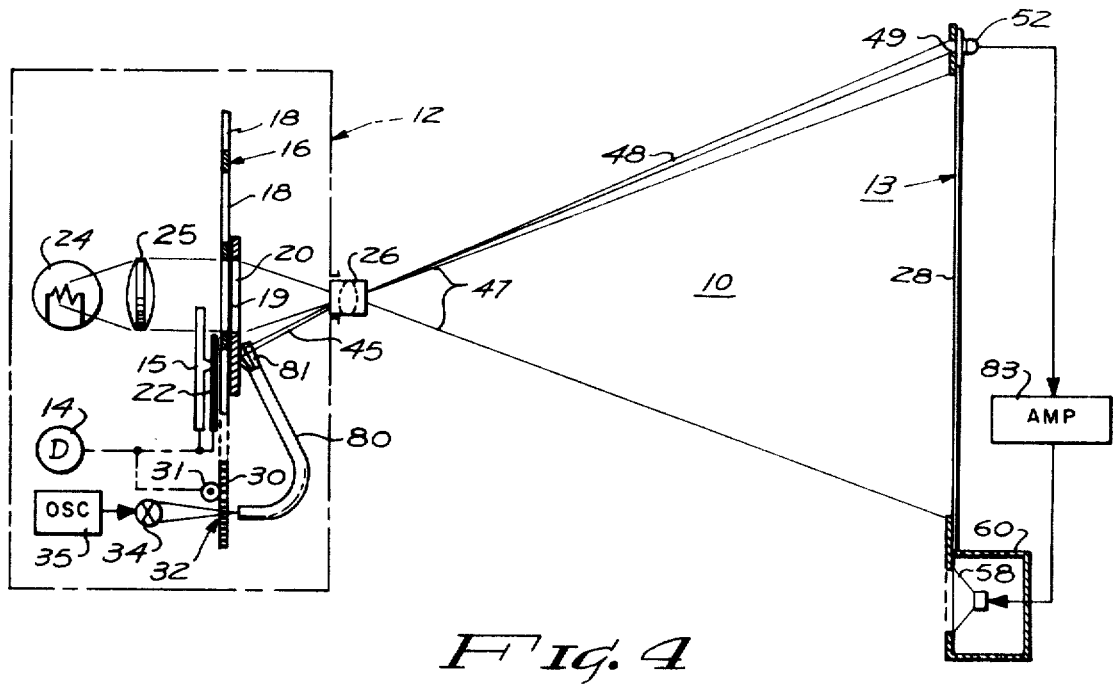
FIG. 4 illustrates yet another modification of the system shown in FIG. 1.

The modification shown in FIG. 4 presents a version which is technologically less desirable than those previously discussed. However, this version may be given preference in some applications because of its considerably lower cost.

According to FIG. 4 a light guide or pipe 80 picks up the sound-modulated optical radiations produced by action of the lamp 34 and sound track 30 at the pickup station 32 and guides these optical radiations to a prism 81 at the image plane 19. The prism 81 reflects these sound-modulated optical radiations 45 into the lens 26 for projection through the slit 49 into the photocell 52.

An amplifier 83, which corresponds to a combination of the above-mentioned preamplifier 53 and power amplifier 59, amplifies the sound-modulated electrical signal produced by the photocell 52 and applies such amplified sound signal to the loudspeaker 58 for audible reproduction.

It will now be recognized that the subject invention provides many significant advances in the display of sound-accompanied motion pictures or other audiovisual performances.

We claim:

1. In a system for displaying recorded images from a motion picture film and reproducing sound accompaniments for the displayed images, which sound accompaniments are recorded on the motion picture film at a displacement from the corresponding images the improvement comprising in combination:
    a. first means for selectively presenting said recorded images in an image plane;
    b. second means spaced from said image plane for picking up said recorded sound accompaniments at a location spaced from said image plane in accordance with said displacement;
    c. third means connected to said second means for presenting at said image plane optical radiations modulated by sound accompaniments picked up by said second means;
    d. fourth means spaced from said image plane and defining a projection plane;
    e. fifth means located at said projection plane for receiving said modulated optical radiations and for audibly reproducing said sound accompaniments from the received modulated optical radiations; and
    f. a projection lens means common to said recorded images and to said modulated optical radiations for both projecting said recorded images from said image plane onto said projection plane and projecting said modulated optical radiations from said third means to said fifth means.

2. A system as claimed in claim 1, wherein said third means include means for presenting at said image plane said modulated optical radiations in the form of invisible radiations capable of being projected by said projection lens means.

3. A system as claimed in claim 2, including filter means located at said fifth means for guarding said invisible radiations received by said fifth means against contamination by visible radiations.

4. A system as claimed in claim 2, wherein said third means include means for time-modulating said invisible radiations by said picked-up sound accompaniments.

5. A system as claimed in claim 2, wherein said invisible radiations are infrared radiations.

6. A system as claimed in claim 5, wherein said third means include means for time-modulating said infrared radiations by said picked-up sound accompaniments.

7. A system as claimed in claim 1, wherein said third means include means for time-modulating said optical radiations by said picked-up sound accompaniments.

8. A system as claimed in claim 1, wherein said second means include sixth means for providing for a modulation of optical radiations with said recorded sound accompaniments at the location spaced from said image plane, and said third means include seventh means extending between said sixth means and said image plane for conducting sound-modulated optical radiations from the sixth means to a location at said image plane for a projection of the conducted sound-modulated optical radiations by said common projection lens means.

9. A system as claimed in claim 8, wherein said seventh means include a light pipe.

10. In motion picture projector apparatus for motion picture film on which sound accompaniments are recorded at a displacement from corresponding motion picture images, the improvement comprising in combination:
    a. a picture gate;
    b. first means for serially presenting motion picture images at said picture gate;
    c. second means spaced from said picture gate for picking up said recorded sound accompaniments for said motion picture images at a location spaced from said picture gate in accordance with said displacement;
    d. third means connected to said second means for presenting at said picture gate optical radiations modulated by sound accompaniments picked up by said second means; and
    e. A projector lens means common to said images presented at said picture gate and said modulated optical radiations for both projecting said images from said picture gate and projecting said modulated optical radiations.

11. An apparatus as claimed in claim 10, wherein said third means include means located at said picture gate for presenting said modulated optical radiations in the form of invisible radiations capable of being projected by said projection lens means.

12. An apparatus as claimed in claim 11, wherein said third means include means for time modulating said invisible radiations by said picked-up sound accompaniments.

13. An apparatus as claimed in claim 10, wherein said third means include means located at said picture gate for presenting said modulated optical radiations in the form of infrared radiations capable of being projected by said projection lens means.

14. An apparatus as claimed in claim 13, wherein said third means include means for time modulating said infrared radiations by said picked-up sound accompaniments.

15. An apparatus as claimed in claim 10, wherein said third means include means for time modulating said optical radiations by said picked-up sound accompaniments.

16. An apparatus as claimed in claim 10, including a motion picture screen structure for displaying said images projected by said common lens projector means, means combined with said screen structure for receiving said modulated optical radiations projected by said common projector lens means, and means connected to said receiving means for audibly reproducing said sound accompaniments at said screen structure in response to said received optical radiations.

17. An apparatus as claimed in claim 10, wherein said second means include fourth means for providing for a modulation of said optical radiations with said recorded sound accompaniments at the location spaced from said picture gate, and said third means include fifth means extending between said fourth means and said picture gate for conducting sound-modulated optical radiations from the fourth means to a location at said picture gate for a projection of the conducted sound-modulated optical radiations by said common projecting lens means.

18. An apparatus as claimed in claim 17, wherein said fifth means include a light pipe.

19. In a system for displaying images recorded on a first medium, and reproducing sound accompaniments recorded on a second medium separate from said first medium, the improvement comprising in combination:
  a. first means for selectively representing said recorded images in an image plane;
  b. second means for picking up said recorded sound accompaniments from said separate second medium;
  c. third means connected to said second means for representing at said image plane optical radiations modulated by sound accompaniments picked up by said second means;
  d. fourth means spaced from said image plane and defining a projection plane;
  e. fifth means located at said projection plane for receiving said modulated optical radiations and for audibly reproducing said sound accompaniments from the received modulated optical radiations; and
  f. a projection lens means common to said recorded images and said modulated optical radiations for both projecting said recorded images from said image plane onto said projection plane and projecting said modulated optical radiations from said third means to said fifth means.

20. A system as claimed in claim 19, wherein said third means include means for presenting at said image plane said modulated optical radiations in the form of invisible radiations capable of being projected by said projection lens means.

21. A system as claimed in claim 20, wherein said third means include means for time modulating said invisible radiations by said picked-up sound accompaniments.

22. A system as claimed in claim 20, including filter means located at said fifth means for guarding said invisible radiations received by said fifth means against contamination by visible radiations.

23. A system as claimed in claim 20, wherein said invisible radiations are infrared radiations.

24. A system as claimed in claim 23, wherein said third means include means for time modulating said infrared radiations by said picked-up sound accompaniments.

25. A system as claimed in claim 19, wherein said third means include means for time modulating said optical radiations by said picked-up sound accompaniments.